United States Patent
Hall et al.

(10) Patent No.: US 9,306,766 B2
(45) Date of Patent: Apr. 5, 2016

(54) VERSATILE SOURCE PORT ENFORCEMENT FOR DATA NETWORKS

(75) Inventors: Brendan Hall, Morristown, NJ (US); Srivatsan Varadarajan, Morristown, NJ (US); Guenther Bauer, Schoenbrunnerstrasse (AT); Wilfried Steiner, Schoenbrunnerstrasse (AT)

(73) Assignee: Honeywell International Inc., Morris Plains, NJ (US)

( * ) Notice: Subject to any disclaimer, the term of this patent is extended or adjusted under 35 U.S.C. 154(b) by 472 days.

(21) Appl. No.: 13/073,260

(22) Filed: Mar. 28, 2011

(65) Prior Publication Data
US 2012/0250572 A1 Oct. 4, 2012

(51) Int. Cl.
*H04L 12/46* (2006.01)
*H04L 12/931* (2013.01)

(52) U.S. Cl.
CPC .......... *H04L 12/4625* (2013.01); *H04L 49/351* (2013.01)

(58) Field of Classification Search
CPC .... H04L 12/4625; H04L 49/351; H04L 45/72
USPC .................................. 370/254, 351
See application file for complete search history.

(56) References Cited

U.S. PATENT DOCUMENTS

| | | | |
|---|---|---|---|
| 5,959,989 A * | 9/1999 | Gleeson et al. | 370/390 |
| 6,044,060 A | 3/2000 | Jones | |
| 6,052,726 A | 4/2000 | Fontenot | |
| 6,742,031 B1 | 5/2004 | Fontenot | |
| 7,012,891 B1 | 3/2006 | Chandran et al. | |
| 7,292,532 B2 | 11/2007 | Sakata et al. | |
| 7,336,682 B2 | 2/2008 | Singh | |
| 7,352,744 B2 | 4/2008 | Saint Etienne et al. | |
| 7,392,279 B1 | 6/2008 | Chandran et al. | |
| 7,483,374 B2 | 1/2009 | Nilakantan et al. | |
| 7,577,164 B2 | 8/2009 | Singh | |
| 7,724,670 B2 | 5/2010 | Nilakantan et al. | |
| 7,787,486 B2 | 8/2010 | Vestal | |
| 7,817,565 B2 | 10/2010 | Cabaret et al. | |
| 2004/0114592 A1* | 6/2004 | Kang et al. | 370/389 |
| 2005/0058118 A1 | 3/2005 | Davis et al. | |
| 2007/0047444 A1 | 3/2007 | Leroy et al. | |

(Continued)

FOREIGN PATENT DOCUMENTS

| | | |
|---|---|---|
| EP | 1265124 | 12/2002 |
| EP | 0986202 | 4/2006 |

OTHER PUBLICATIONS

"Developing AFDX Solutions", "Available at http://www.actel.com/documents/AFDX_Solutions_AN.pdf accessed Mar. 2, 2011", Mar. 2005, Publisher: Actel Corporation.

(Continued)

*Primary Examiner* — Man Phan
*Assistant Examiner* — Mandish Randhawa
(74) *Attorney, Agent, or Firm* — Fogg & Powers LLC

(57) ABSTRACT

A communication switch comprises a plurality of ports and a processing unit configured to identify source ports and destination ports from the plurality of ports on a per virtual link basis. Each virtual link comprises one or more source ports via which frames are received from one or more source nodes and one or more destination ports via which received frames are forwarded to one or more destination nodes. For at least one virtual link, the processing unit is configured to accept more than one of the plurality of ports as source ports.

17 Claims, 3 Drawing Sheets

(56) References Cited

U.S. PATENT DOCUMENTS

| | | | |
|---|---|---|---|
| 2007/0297406 A1* | 12/2007 | Rooholamini | 370/390 |
| 2008/0043768 A1 | 2/2008 | Lopez et al. | |
| 2009/0073984 A1* | 3/2009 | Jackson | 370/394 |
| 2009/0180482 A1 | 7/2009 | Andreoletti et al. | |
| 2009/0201803 A1* | 8/2009 | Filsfils et al. | 370/222 |
| 2010/0195531 A1 | 8/2010 | Andreoletti et al. | |
| 2011/0138080 A1 | 6/2011 | Steiner et al. | |
| 2011/0222544 A1* | 9/2011 | Medina et al. | 370/392 |
| 2012/0027022 A1* | 2/2012 | Birkedahl | 370/401 |
| 2012/0039334 A1* | 2/2012 | Mehta et al. | 370/390 |
| 2012/0250694 A1 | 10/2012 | Hall et al. | |
| 2013/0290428 A1* | 10/2013 | Petit-Huguenin | 709/204 |

OTHER PUBLICATIONS

"AFDX/ARINC 664 Tutorial", "Available at http://www.techsat.com/fileadmin/media/pdf/infokiosk/TechSAT_TUT-AFDX-EN.pdf accessed Mar. 2, 2011", Aug. 29, 2008, Publisher: TechSAT GmbH.

"AFDX Workshop: Avionics Databus Solutions", "Available at http://www.afdx.com/AFDX_Training_October_2010_Full.pdf accessed Mar. 2, 2011", Mar. 2010, Publisher: AIM GmbH.

Basu et al., "Verification of an AFDX Infrastructure using Simulations and Probabilities", "Proceedings of the First international conference on Runtime verification", 2010, Publisher: Springer-Verlag, Published in: Berlin.

"Traffic-Shaping Carrier Access Module for the Cisco Catalyst 8510 and LightStream 1010 Switches", "Available at http://www.berkcom.com/resources/cisco/C8540_smalc_ds.pdf accessed Mar. 2, 2011", Jul. 17, 2001, Publisher: Cisco Systems, Inc.

"AFDX Protocol Tutorial", "Available at http://www.cems.uwe.ac.uk/~ngunton/afdx_detailed.pdf accessed Mar. 2, 2011", 2005, Publisher: Condor Engineering, Inc.

Frances et al., "Using Network Calculus to Optimize the AFDX Network", "3rd European Congress ERTS Embedded real-time software available at http://oatao.univ-toulouse.fr/2159/1/Frances_2159.pdf accesssed Mar. 2, 2011", Jan. 25-27, 2006, Publisher: ERTS 2006, Published in: Toulouse, France.

"AFDX/ARINC 664 Protocol Tutorial", "Available at http://www.systerra.de/documents/AFDX$_{13}$ Tutorial_WP.pdf accessed Mar. 2, 2011", 2007, Publisher: GE Fanuc Embedded Systems.

Oishi, Roy, "Deterministic Ethernet for Avionics", "Avionics Magazine available at http://www.aviationtoday.com/av/issue/feature/26289.html accessed Mar. 2, 2011", Oct. 1, 2008, Publisher: Aviation Today.

Hall et al, "Centralized Traffic Shaping for Data Networks", "U.S. Appl. No. 13/073,269, filed Mar. 28, 2011", pp. 1-19, Published in: US.

Hall et al, "Embedded End-To-End Delay Information for Data Networks", "U.S. Appl. No. 13/217,823, filed Aug. 25, 2011", Published in: US.

European Patent Office, "Office Action", Jul. 3, 2012, Published in: EP.

European Patent Office, "European Search Report", mailed Jun. 27, 2012, Published in: EP.

"Virtual LAN: Application and Technology—a white paper", Jan. 1, 2004, pp. 1-7, Publisher: retrieved from the internet URL: http://www.micrel.com/_PDF/Ethernet/Whitepaper/vlanswp.pdf.

Sommer et al., "Ethernet—A Survey on its Fields of Application", Apr. 2010, pp. 263-284, vol. 12, No. 2, Publisher: IEEE.

The European Patent Office, "European Office Action for EP Application No. 12161356.6", from European Counterpart to U.S. Appl. No. 13/073,260, Jun. 23, 2014, pp. 1-6.

\* cited by examiner

VERSATILE SOURCE PORT ENFORCEMENT FOR DATA NETWORKS

BACKGROUND

Some conventional data networks use virtual links. For example, ARINC 664 part 7 defines a profiled Ethernet that allows analyzing traffic flows between endpoints of a full-duplex switched Ethernet network with respect to transmission timing. ARINC standard 664 part 7 defines a virtual link as a unidirectional logic path from one and only one source node to one or more destination nodes. At the Ethernet network level a virtual link is realized by a locally administered multicast group with a network-wide unique multicast Ethernet address. That is all frames of a virtual link use the same Ethernet multicast destination address, whereas frames of different virtual links use different Ethernet multicast destination addresses. At the Ethernet network level, frames of a virtual link can thus be identified by their destination Ethernet addresses.

SUMMARY

In one embodiment, a communication switch is provided. The communication switch comprises a plurality of ports and a processing unit configured to identify source ports and destination ports from the plurality of ports on a per virtual link basis. Each virtual link comprises one or more source ports via which frames are received from one or more source nodes and one or more destination ports via which received frames are forwarded to one or more destination nodes. For at least one virtual link, the processing unit is configured to accept more than one of the plurality of ports as source ports.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
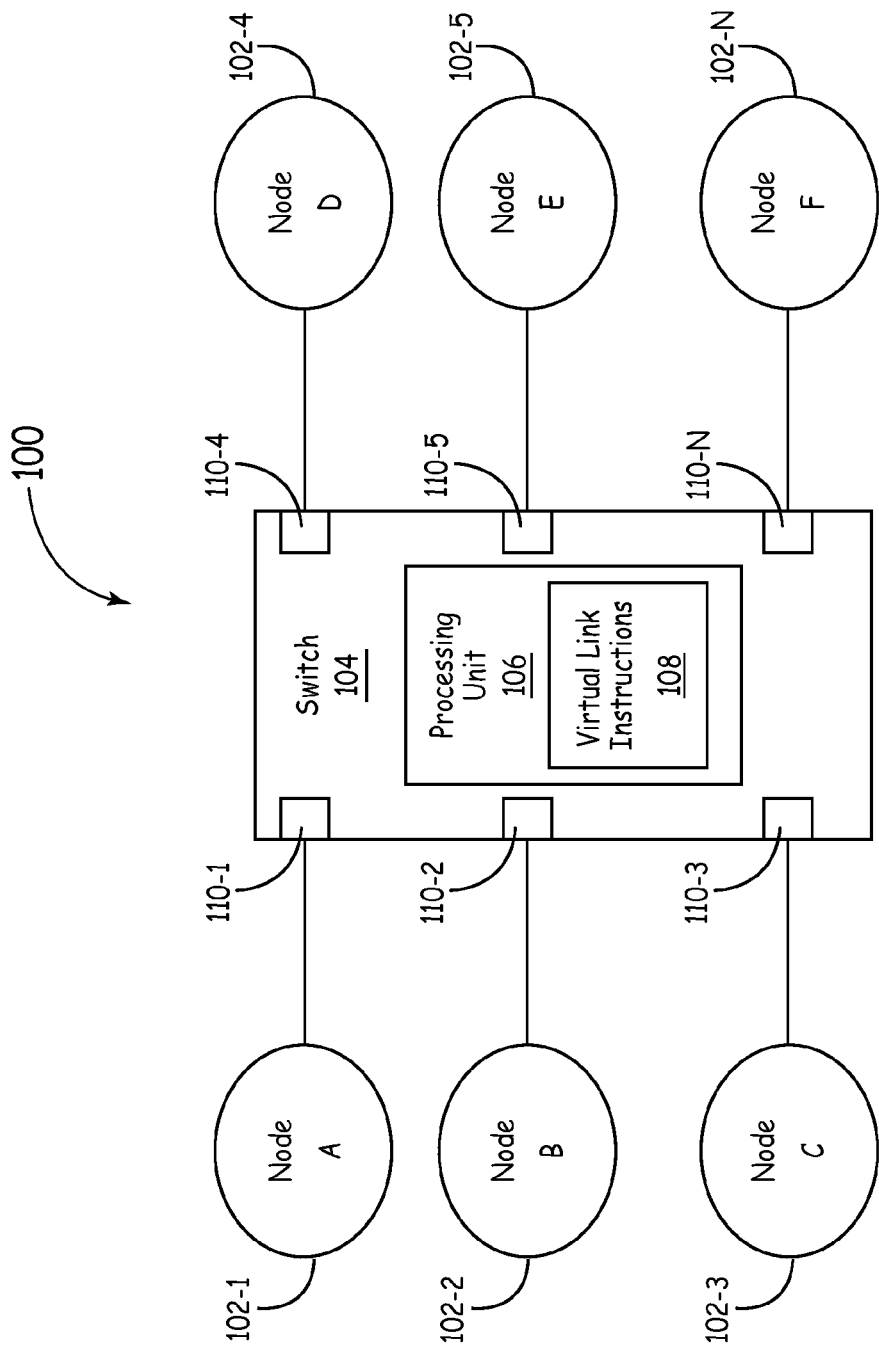
FIG. 1 is a block diagram of one embodiment of a communication system.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual acts may be performed. The following detailed description is, therefore, not to be taken in a limiting sense.

FIG. 1 is a block diagram of one embodiment of a communication system 100. Communication system 100 includes a plurality of nodes 102-1 . . . 102-N (also labeled as nodes A-F and referred to as end-systems) and a switch 104. Each node 102-1 . . . 102-N is coupled to a respective port 110-1 . . . 110-N of the switch 104. Switch 104 is configured to route frames received from the nodes 102 based on virtual links. A virtual link is a unidirectional logic path connecting two or more nodes 102 via the switch 104. For example, in some embodiments, communication system 100 is full duplex switched Ethernet network configured to implement a protocol compatible with the Aeronautical Radio, Incorporated (ARINC) standard 664 part 7 (also referred to as Avionics Full-Duplex Switched Ethernet (AFDX)).

At the network level, a virtual link is realized by a locally administered multicast group with a network-wide unique multicast address. That is, all the frames of a virtual link use the same multicast destination address, whereas frames of different virtual links use different multicast destination addresses. Thus, the frames of a virtual link can be identified by their destination address. For example, in the ARINC standard 664 part 7, the destination address is a 48-bit integer value, the lower 16 bits of which are used as a virtual link ID.

The conventional ARINC standard 664 part 7 defines a virtual link as a unidirectional logic path from one and only one source node to one or more destination nodes. However, unlike the ARINC standard 664 part 7, the switch 104 is configured to accept more than one source node for each virtual link. For example, Table 1 below shows exemplary valid virtual links accepted by switch 104.

TABLE 1

| Virtual Link | Source Node | Destination Node |
| --- | --- | --- |
| 1 | Node A | Node B, Node C |
| 2 | Node A, Node F | Node D |
| 3 | Node A, Node F | Node C, Node D, Node E |
| 4 | Node D | Node D |
| 5 | Node E | Node E, Node F |

As can be seen in Table 1, various combination of source and destination nodes are accepted by switch 104. For example, virtual link 1 includes a single source node and a plurality of destination nodes. Virtual link 2 includes a plurality of source nodes and a single destination node. Virtual link 3 includes a plurality of source nodes and a plurality of destination nodes. Virtual link 4 loops the frame back to the source node. In other words, the source node is the same as the destination node. Finally, for virtual link 5, the switch 104 routes the frame from the source node back to the source node as well as to another destination node. Each of the virtual links is accepted as a valid virtual link by switch 104.

In addition, in some embodiments, the switch 104 is configured to determine, on a per virtual link basis, the destination ports as a function of the source port over which the frame was received. For example, the switch 104 is configured in some such implementations with a destination port vector for each virtual link that associates the source port or ports with one or more destination ports. Thus, when a frame is received over a port 110, the switch 104 determines to which port the frame should be forwarded based on the source port over which the frame was received.

If the frames of a virtual link are produced at more than one node 102, the switch 104 can implement, in some embodiments, an implicit pick-first-valid redundancy scheme. In other words, the first frame received on a valid source port for the virtual link is selected. Additional frames received on other valid source ports for the virtual link are silently discarded as being redundant. The term 'silently discarded' means that the frame is discarded without increasing an error count. For example, in some embodiments, the switch 104 is configured to have a blackout period for each virtual link. A blackout period specifies a time interval, after a frame has been accepted for a virtual link, during which all other frames of the same virtual link are considered redundant copies and dropped. The length of the blackout period can be set independently for each virtual link.

The switch 104 is also configured to implement a traffic policing scheme on a per-virtual link, per-source port basis. That is the traffic policy is configured for each source port of each virtual link. This granularity enables all frames of a virtual link received on a particular source port to flow irrespective of frames of the same virtual link received on other source ports. For example, in implementing a frame-based policy, a bandwidth allocation gap (BAG) is defined in ARINC 664 part 7 as a minimal distance of any two frames of the same virtual link at a node that transmits only messages of a single virtual link. Thus, even if frames of a virtual link are received on different ports of the switch 104 faster than the specified BAG for the virtual link, the switch 104 is still able to process them without increasing an error count since the traffic policy is extended to be specific to each source port as opposed to the virtual link.

In addition to implementing frame-based policing on a per-source port, per-virtual link basis, the switch 104 is also configured, in some embodiments, to implement byte-based policing on a per-source port, per virtual link basis. In frame-based policing, a minimum distance between any two frames of the same virtual link is ensured (irrespective of the actual frame lengths). In the byte-based policing, a maximum bandwidth in terms of bits per second is enforced which includes checking for the minimum frame length in addition to checking for the maximum frame length. It is to be understood that the byte-based policing and frame-based policing discussed above are provided by way of example and not by way of implementation. In particular, it is to be understood that other policing schemes known to one of skill in the art can be used in other embodiments.

To implement the functionality described above, the switch 104 includes a processing unit 106. The processing unit 106 includes or functions with software programs, firmware or other computer readable instructions for carrying out various methods, process tasks, calculations, and control functions, used in routing frames of virtual links. For example, the processing unit 106 executes virtual link instructions 108 which enable the switch to accept a plurality of source ports for a given virtual link.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

Figure 2:
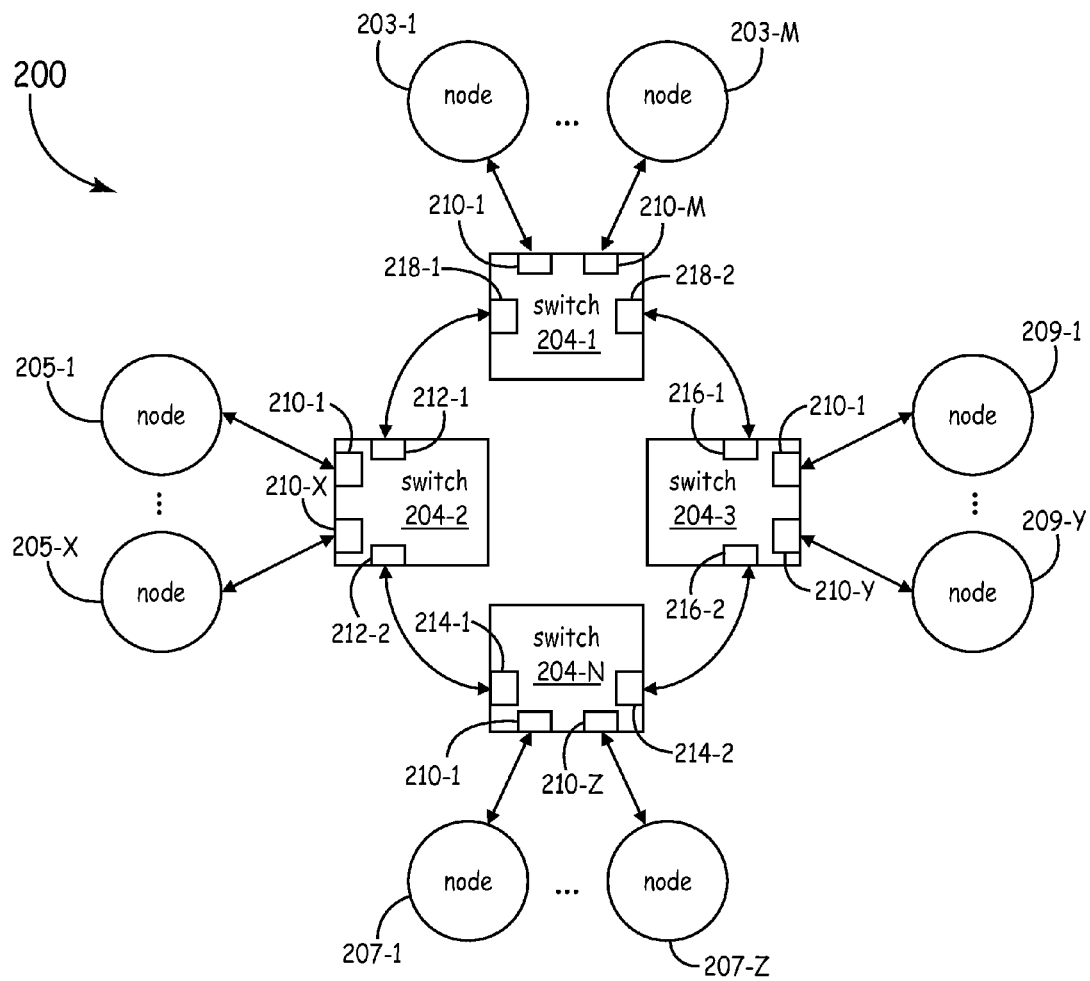
FIG. 2 is a block diagram of another embodiment of a communication system.

FIG. 2 is a block diagram of another embodiment of an exemplary communication system 200. Communication system 200 includes a plurality of switches 204-1 . . . 204-N. Each of switches 204 is configured similarly to switch 104 described above. Configuring switches 204 as described above enables implementing the switches 204 in a ring topology, as shown in FIG. 2, without compromising the diagnostics information collected by the switch. In particular, each of switches 204 is coupled to a first neighbor switch in a first direction and to a second neighbor switch in a second direction. As used herein, a neighbor switch is defined to mean a switch that is directly coupled to the present switch. For example, switch 204-2 is coupled directly to switch 204-1 in a first direction and to switch 204-N is a second direction. Hence, switches 204-1 and 204-N are neighbor switches of switch 204-2.

Each of switches 204 is configured with a vector of source ports for each virtual link. The vector can be implemented as a table, a flat file database, etc. Thus, receiving frames of a single virtual link on different ports is not an error condition. However, receiving frames of a single virtual link on the same port may still be an error condition if the traffic policy for the virtual link on that respective port is violated. This may be the case even if frames of the same virtual link are allowed on other ports. If a frame is received on a source port of the respective virtual link, as defined by the associated vector, an error count is not increased. However, this behavior (not increasing the error count) is implemented only by the switch or switches 204 that are coupled directly to the node or nodes that produced the frames of the virtual link.

The switch 204 that receives the frame from the source node is configured to forward the frame to the switches 204 that are adjacent to the respective switch 204. For example, in the event that switch 204-2 receives a frame from a corresponding source node 205-1, the switch 204-2 forwards the frame to switches 204-1 and 204-N, which are adjacent to the switch 204-2, over ports 212-1 and 212-2. Switch 204-2 is configured, in this example, to drop any frames for the respective virtual link that are received from switches 204-1 or 204-N over ports 212-1 and 212-2. In addition, the switch 204-2, in some embodiments, is configured to increase an error count. In contrast, since switches 204-1, 204-3 and 204-N are not directly coupled to the source node 205-1, each of switches 204-1, 204-3 and 204-N is configured to accept and forward the frame forwarded from switch 204-2. For example, switches 204-1 and 204-N will forward the received frame over ports 218-2 and 214-2, respectively, in addition to forwarding the frame to any corresponding destination ports for the respective virtual link. In other embodiments, the switch 204-2 is configured to accept the first validly received frame even if switch 204-2 is coupled to a source node and the first validly received frame is received from one of the switches 204-1 and 204-N.

Notably, more than one node can be configured to a source node for a given virtual link, as described above. In some embodiments, only nodes coupled to the same switch can be configured as source nodes for a given virtual link. In other embodiments, nodes coupled to different switches can be accepted as source nodes for the same virtual link. For example, in such an embodiment, nodes 205-1 and 207-1 can each be accepted as a source node for the same virtual link. In some such embodiments, the switches 204 are not configured to increase an error count if a frame is received over both a source port and over a port coupled to another switch. However, the frame received over the port coupled to another switch is silently dropped as a redundant frame in some such embodiments. In other embodiments, the first validly received frame is passed on and the other validly received frames are silently dropped. Thus, in such embodiments, the frame received from one of the other switches can be passed on while the frame received over a port coupled to a node is dropped. It should also be noted that the mechanism for managing redundancy, such as picking the first validly received frame, is executed after the traffic policing function of the respective ports.

Figure 3:
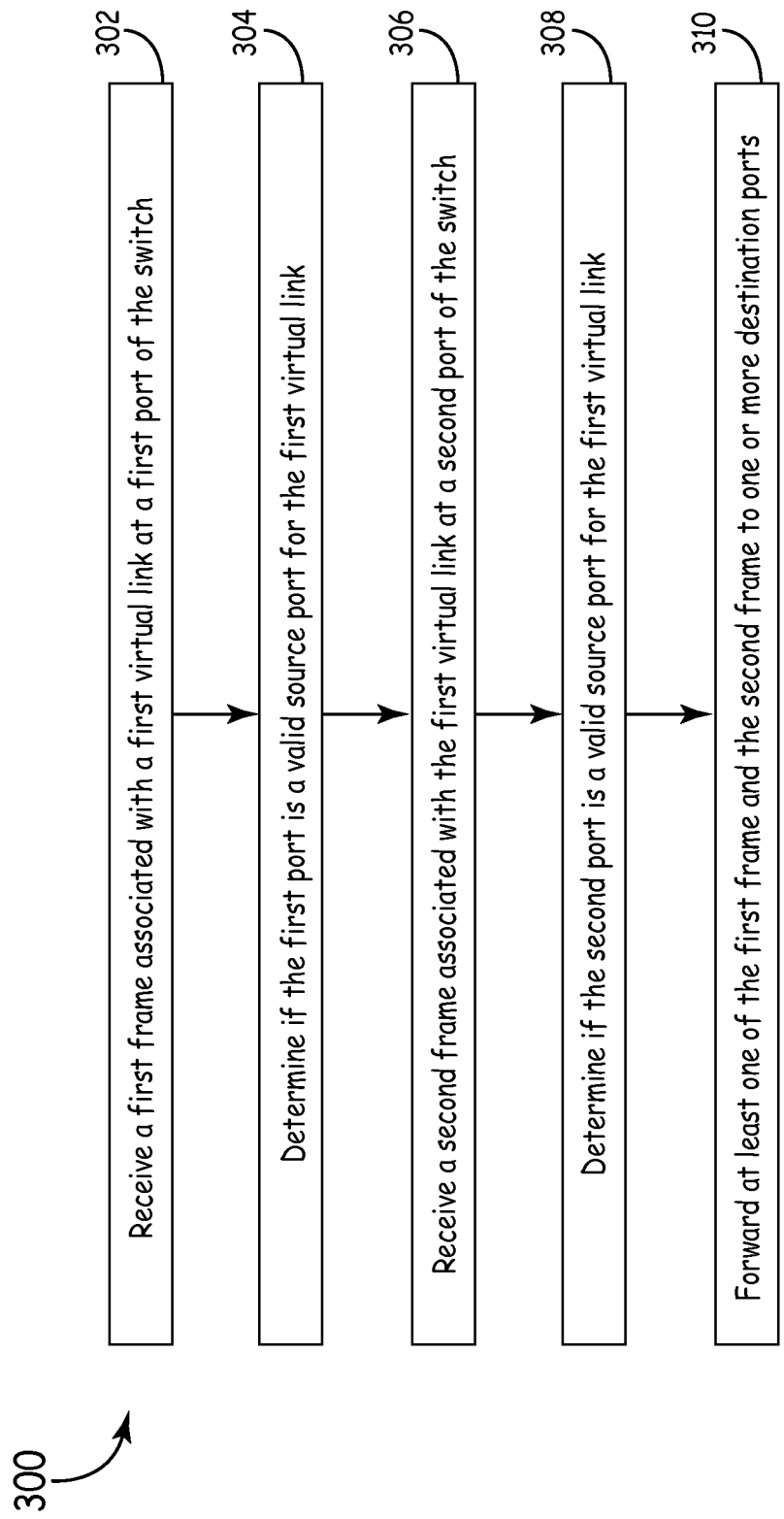
FIG. 3 is a flow chart depicting a method of routing frames of a virtual link.

FIG. 3 is a flow chart depicting one embodiment of a method 300 of routing frames of a virtual link. Method 300 can be implemented by a switch, such as switch 104 discussed above. At block 302, a first frame associated with a first virtual link is received at a first port of the switch. At block 304, the switch determines if the first port is a valid source port for the first virtual link. At block 306, a second frame associated with the first virtual link is received at a second port of the switch. At block 308, the switch determines if the second port is a valid source port for the first virtual link. Each of the first and second ports can be coupled directly to a node or to another switch in a ring topology as discussed above.

In some embodiments, the switch determines if the first port and second port are valid source ports by looking up a list of valid source ports corresponding to the first virtual link. In addition, in some embodiments, determining if the first port and second port are valid source ports includes policing functions as described above. For example, the switch is configured in some embodiments to enforce a traffic policy on a per-source port basis for each virtual link. In other words, a separate frame-based or byte-based policy is implemented for each valid source port of the first virtual link. If the first frame or the second frame does not meet the traffic policy (e.g. the frame exceeds a maximum allowed frame length or doesn't comply with the minimum bandwidth allocation gap), then the frame is dropped. In addition, in some implementations, after determining that the first port is a valid source port, the switch initiates a blackout period. If the second frame is received during the blackout period, the second frame is silently dropped even if it is received on a valid source port and complies with the respective traffic policy.

Furthermore, in some embodiments, the switch is coupled to a plurality of other switches in a ring topology. In some such embodiments, determining if the first port and second port are valid source ports includes determining if the first port or the second port is coupled to another switch or to a source node. If one of the first port or the second port is coupled to a source node and the other port is coupled to another switch, then the corresponding frame from the port coupled to another switch is dropped in some such embodiments. For example, if the first port is coupled to a source node and the second port is coupled to another switch, then the switch is configured to drop the second frame and, in some embodiments, increase an error count at the switch. However, if neither the first port nor the second port is coupled to a source node, then a port coupled to another switch is considered a valid source port provided it meets the traffic policy. In addition, if both the first port and the second port are coupled to a source node, then both the first port and the second port are valid source ports provided the respective frame meets the respective traffic policy.

At block 310, the switch forwards at least one of the first frame and the second frame to one or more destination ports. For example, if the first port is a valid port for the first virtual link and the second port is not a valid source port, the switch forwards the first frame to one or more destination ports associated with the virtual link. In some embodiments, the one or more destination ports are determined as a function of the source port. For example, in some such embodiments, the switch includes a destination port vector which associates one or more destination ports with a source port corresponding to the respective virtual link. If the first port is not a valid source port and the second port is a valid source port, the switch forwards the second frame to the one or more destination ports. If both the first and second ports are valid source ports for the first virtual link, the switch forwards one of the first frame and the second frame to the one or more destination ports. The switch determines which frame to forward using a redundancy management mechanism, such as picking the first validly received frame.

It is to be understood that although method 300 is discussed in terms of receiving frames at two ports, frames can be received at more than two ports. For example, in some embodiments, a frame can be received from one or more source nodes, as well as from one or more other switches, as described above.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. An Avionics Full-Duplex Switched Ethernet (AFDX) compatible communication switch comprising:
   a plurality of ports; and
   a processing unit configured to identify source ports and destination ports from the plurality of ports on a per AFDX virtual link basis, wherein an AFDX virtual link is a unidirectional logic path that comprises one source port via which frames are received from one source node and one or more destination ports via which received frames are forwarded to one or more destination nodes; and
   wherein the processing unit is configured to accept at least one AFDX virtual link having more than one simultaneously active source port as a valid virtual link;
   wherein the received frames of each respective virtual link use the same respective multicast destination address.

2. The communication switch of claim 1, wherein the processing unit is further configured to identify the destination ports for each virtual link as a function of the one or more source ports over which a corresponding frame is received.

3. The communication switch of claim 1, wherein the processing unit is configured to determine on a per virtual link basis for each port when to increase an error count.

4. The communication switch of claim 1, wherein the processing unit is configured to determine a blackout time period on a per-port and per-virtual link basis, wherein the blackout time period is a period beginning after a frame of a virtual link is received and during which additional frames of the virtual link are silently dropped when received on any eligible source port for the virtual link.

5. The communication switch of claim 1, wherein one of the plurality of ports is coupled to a first neighbor switch in a first direction and another of the plurality of ports is coupled to a second neighbor switch in a second direction.

6. An Avionics Full-Duplex Switched Ethernet (AFDX) compatible communication system comprising:
   A plurality of nodes;
   A plurality of communication links; and
   at least one switch having a plurality of ports, each port coupled to one of the plurality of nodes via one of the plurality of communication links, wherein the switch is configured to designate each port as a source port or a destination port on a per AFDX virtual link basis, wherein an AFDX virtual link is a unidirectional logic path that comprises one source port via which frames are received from one source node and one or more destination ports via which received frames are forwarded to one or more destination nodes; and wherein the at least one switch is configured to accept at least one AFDX virtual link having more than one simultaneously active source port as a valid virtual link;

wherein the received frames of each respective virtual link use the same respective multicast destination address.

7. The communication system of claim 6, wherein the at least one switch is further configured to identify the destination ports for each virtual link as a function of the one or more source ports over which a corresponding frame is received.

8. The communication system of claim 6, wherein the at least one switch is configured to determine on a per virtual link basis for each port when to increase an error counter.

9. The communication system of claim 6, wherein the at least one switch is configured to determine a blackout time period on a per port per virtual link basis, wherein the blackout time period is a period beginning after a frame of a virtual link is received and during which additional frames of the virtual link are dropped when received on any eligible source port for the virtual link.

10. The communication system of claim 6, wherein the at least one switch comprises a plurality of switches, wherein each switch is coupled to a first neighbor switch in a first direction and to a second neighbor switch in a second direction, the plurality of switches coupled to form a ring topology.

11. The communication system of claim 10, wherein each of the plurality of switches is configured to drop frames received over a port coupled to one of the respective first neighbor switch and the respective second neighbor switch if the respective switch is coupled to a source node.

12. A method of routing frames of a virtual link in an Avioincs Full-Duplex Switched Ethernet (AFDX) compatible switch, the method comprising:

receiving a respective frame associated with the AFDX virtual link at each of a plurality of ports of the switch, wherein an AFDX virtual link is a unidirectional logic path that comprises one source port via which frames are received from one source node and one or more destination ports via which received frames are forwarded to one or more destination nodes;

wherein each frame associated with the AFDX virtual link uses the same multicast destination address;

determining if each of the plurality of ports at which a frame is received is a valid source port for the AFDX virtual link;

when more than one of the plurality of ports is a valid source port and simultaneously active for the AFDX virtual link, forwarding at least one of the received frames to one or more destination ports.

13. The method of claim 12, wherein determining if each of the plurality of ports is a valid source port includes enforcing traffic policies.

14. The method of claim 13, wherein when one of the plurality of ports is determined to be a valid source port, enforcing traffic policies includes dropping subsequently received frames at other ports of the plurality of ports without increasing an error count if the subsequently received frames are received during a predetermined time period after receipt of the frame at the port determined to be a valid source port, the length of the predetermined time period being specific to the virtual link.

15. The method of claim 12, wherein receiving a frame associated with the virtual link at each of the plurality of ports comprises:

receiving a frame over at least one of a first port coupled to a first switch in a first direction, a second port coupled to a second switch in a second direction, and a third port coupled to a node; and wherein:

when forwarding a frame from the first port, forwarding the at least one received frame comprises forwarding the at least one frame to the second and third ports;

when forwarding a frame from the second port, forwarding the at least one received frame comprises forwarding the at least one frame to the first and third ports; and when forwarding a frame from the third port, forwarding the at least one received frame comprises forwarding the at least one received frame to the first and second ports.

16. The method of claim 12, further comprising:

determining when to increase an error count on a per-port, per virtual link basis.

17. The method of claim 12, further comprising:

determining the one or more destination ports as a function of the port from which the forwarded frame is received.

\* \* \* \* \*